US012585961B1

(12) United States Patent
Zheng et al.

(10) Patent No.: US 12,585,961 B1
(45) Date of Patent: Mar. 24, 2026

(54) DATA SHUFFLE OPTIMIZATION

(71) Applicant: Amazon Technologies, Inc., Seattle, WA (US)

(72) Inventors: Hongbin Zheng, San Jose, CA (US); Jie Wang, Sunnyvale, CA (US); Sheng Xu, Santa Clara, CA (US); Qingrui Liu, Burlingame, CA (US); Pushkar Ratnalikar, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 943 days.

(21) Appl. No.: 17/656,392

(22) Filed: Mar. 24, 2022

(51) Int. Cl.
 *G06N 3/10* (2006.01)
(52) U.S. Cl.
 CPC ...................................... *G06N 3/10* (2013.01)
(58) Field of Classification Search
 CPC ......................................................... G06N 3/10
 See application file for complete search history.

(56) References Cited

U.S. PATENT DOCUMENTS

| | | | | |
|---|---|---|---|---|
| 5,475,842 A | * | 12/1995 | Gilbert ..................... | G06F 8/453 717/160 |
| 5,953,531 A | * | 9/1999 | Megiddo ................. | G06F 8/443 717/160 |
| 6,381,739 B1 | * | 4/2002 | Breternitz, Jr. ..... | G06F 11/3612 714/37 |
| 7,757,222 B2 | * | 7/2010 | Liao .......................... | G06F 8/45 717/160 |
| 2005/0060696 A1 | * | 3/2005 | Bicsak .................... | G06F 8/433 717/156 |
| 2023/0177307 A1 | * | 6/2023 | Wang ....................... | G06N 3/08 706/26 |

OTHER PUBLICATIONS

Zerrell, Tim, and Jeremy Bruestle. "Stripe: Tensor compilation via the nested polyhedral model." arXiv preprint arXiv:1903.06498 (Year: 2019).*

(Continued)

*Primary Examiner* — Shahid K Khan
(74) *Attorney, Agent, or Firm* — Weaver Austin Villeneuve & Sampson LLP

(57) ABSTRACT

An optimization algorithm is disclosed to reduce the number of data shuffle operators in a data flow graph representing a neural network model for a neural network. The optimization algorithm can identify single-entry single-exit (SESE) regions in the data flow graph and select the SESE regions that comprise only the data shuffle operators. An affine map for each selected SESE region can be generated from an input of the selected SESE region to an output of the selected SESE region. An affine shuffle operator corresponding to an affine map for a selected SESE region can replace that SESE region if an implementation cost of the affine map is lower than the implementation cost of the SESE region. Thus, by replacing the selected SESE regions comprising multiple data shuffle operators with corresponding affine shuffle operators, it is possible to reduce the total number of operators in the data flow graph and optimize the neural network model.

20 Claims, 11 Drawing Sheets

(56) References Cited

OTHER PUBLICATIONS

Mikhailov, Andrey, et al. "Control flow graph visualization in compiled software engineering." 2016 39th International Convention on Information and Communication Technology, Electronics and Microelectronics (MIPRO). IEEE (Year: 2016).*

Lim, Amy Wingmui. Improving parallelism and data locality with affine partitioning. Stanford University (Year: 2001).*

Baskaran, Muthu Manikandan, et al. "A compiler framework for optimization of affine loop nests for GPGPUs." Proceedings of the 22nd annual international conference on Supercomputing (Year: 2008).*

Lee, Seyong, Seung-Jai Min, and Rudolf Eigenmann. "OpenMP to GPGPU: a compiler framework for automatic translation and optimization." ACM Sigplan Notices 44.4 (2009): 101-110 (Year: 2009).*

Lim, Amy W., and Monica S. Lam. "Maximizing parallelism and minimizing synchronization with affine transforms." Proceedings of the 24th ACM SIGPLAN-SIGACT symposium on Principles of programming languages. (Year: 1997).*

Dave, Shail, et al. "Dmazerunner: Executing perfectly nested loops on dataflow accelerators." ACM Transactions on Embedded Computing Systems (TECS) 18.5s (2019): 1-27 (Year: 2019).*

Bondhugula, Uday, et al. "A practical automatic polyhedral parallelizer and locality optimizer." Proceedings of the 29th ACM SIGPLAN Conference on Programming Language Design and Implementation. (Year: 2008).*

Shirako, Jun, and Vivek Sarkar. "Integrating data layout transformations with the polyhedral model." Proceedings of International Workshop on Polyhedral Compilation Techniques (IMPACT'19), D. Wonnacott and O. Zinenko (Eds.). Valencia, Spain. (Year: 2019).*

Johnson, Richard, David Pearson, and Keshav Pingali. "The program structure tree: Computing control regions in linear time." Proceedings of the ACM SIGPLAN 1994 conference on Programming language design and implementation. (Year: 1994).*

* cited by examiner

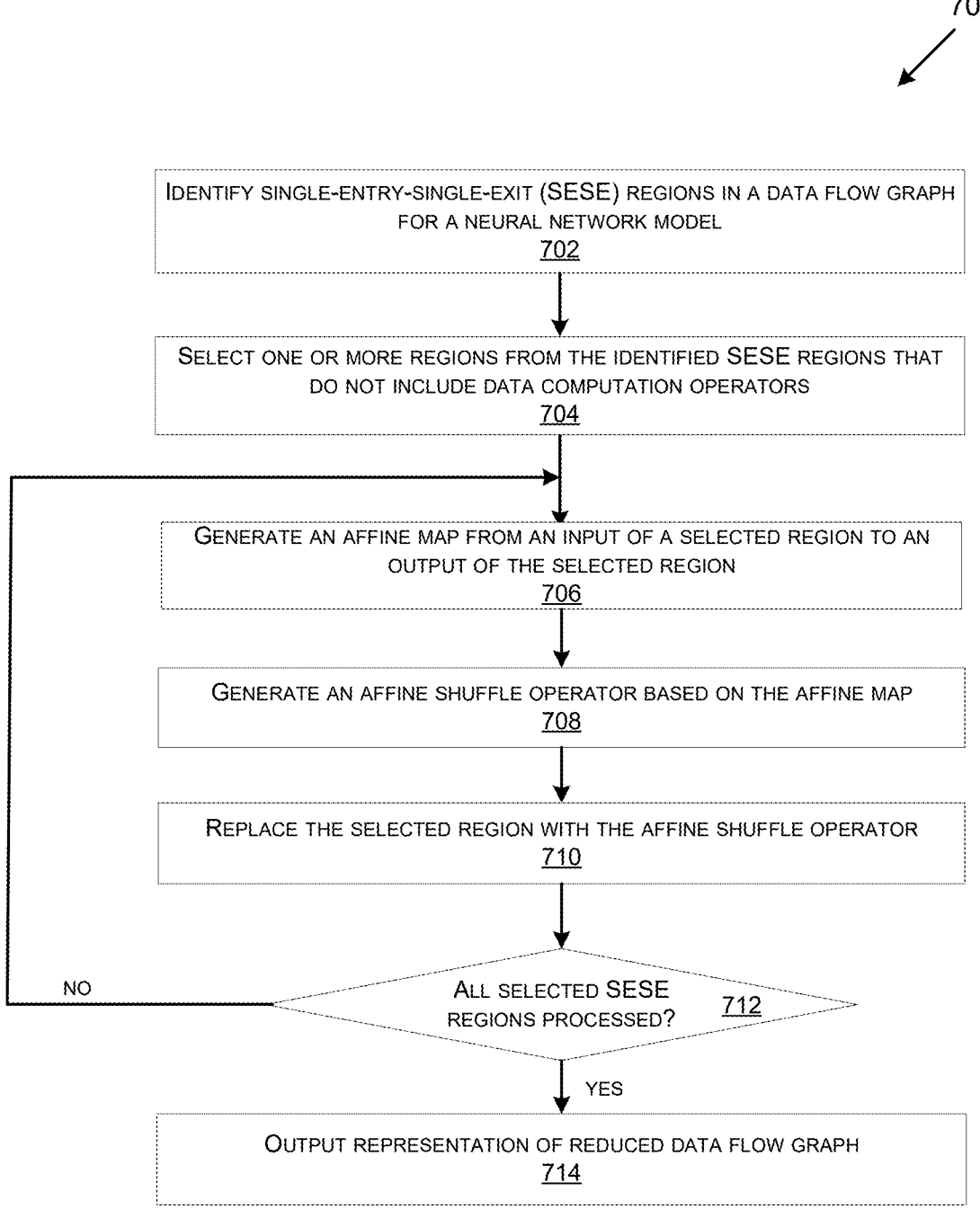

700

IDENTIFY SINGLE-ENTRY-SINGLE-EXIT (SESE) REGIONS IN A DATA FLOW GRAPH FOR A NEURAL NETWORK MODEL
702

SELECT ONE OR MORE REGIONS FROM THE IDENTIFIED SESE REGIONS THAT DO NOT INCLUDE DATA COMPUTATION OPERATORS
704

GENERATE AN AFFINE MAP FROM AN INPUT OF A SELECTED REGION TO AN OUTPUT OF THE SELECTED REGION
706

GENERATE AN AFFINE SHUFFLE OPERATOR BASED ON THE AFFINE MAP
708

REPLACE THE SELECTED REGION WITH THE AFFINE SHUFFLE OPERATOR
710

ALL SELECTED SESE REGIONS PROCESSED? 712

NO

YES

OUTPUT REPRESENTATION OF REDUCED DATA FLOW GRAPH
714

DATA SHUFFLE OPTIMIZATION

BACKGROUND

Neural networks utilize computational models to perform complex tasks such as image recognition, natural language processing, among others. A neural network may be represented using a data flow graph comprising different types of operations to be performed on an input data set. The operations may include computations, data rearrangements such as transformations, memory accesses, and/or other operations. A compiler can be used to generate machine level instructions based on the data flow graph, which can be executed by a neural network processor to generate output data based on the input data set.

BRIEF DESCRIPTION OF THE DRAWINGS

Various embodiments in accordance with the present disclosure will be described with reference to the drawings, in which:

FIG. 7 shows an example flow chart for a method to optimize a neural network model, according to some embodiments;

DETAILED DESCRIPTION

Figure 1:
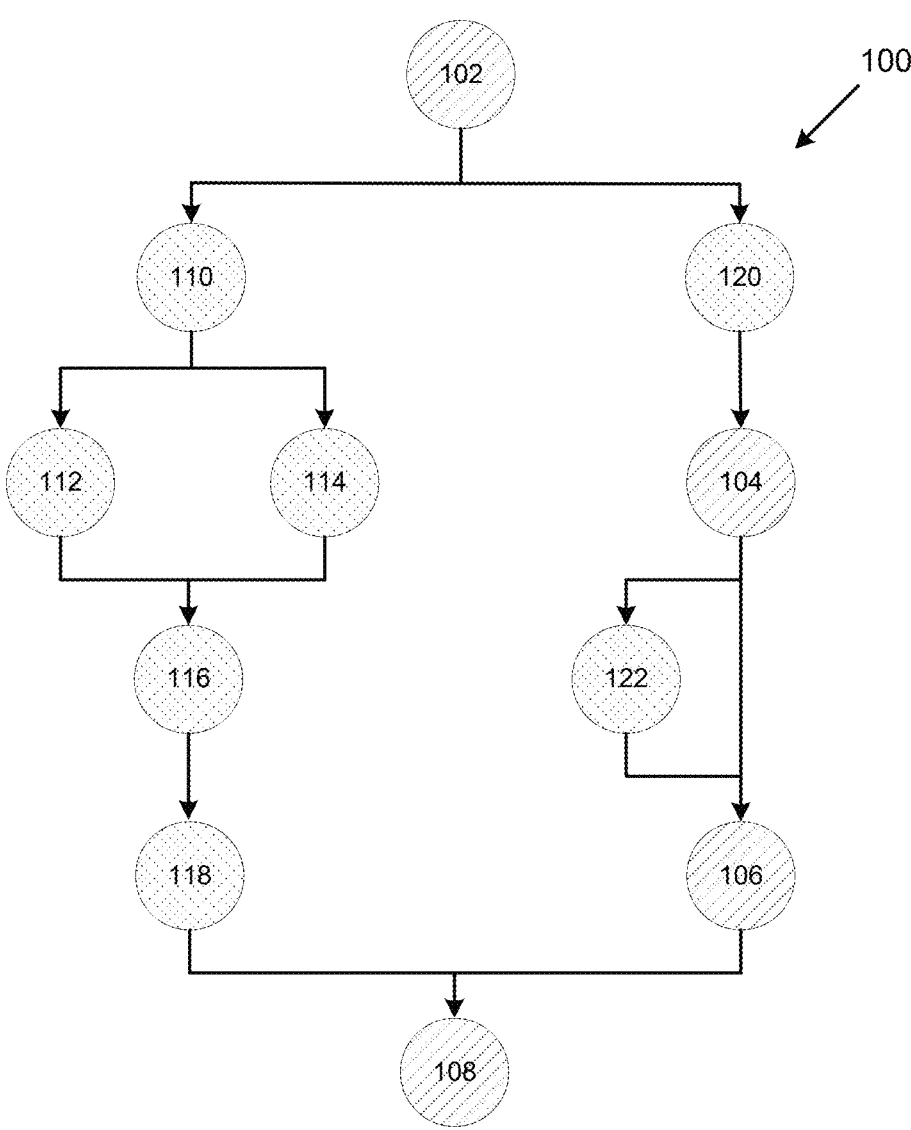
FIG. 1 shows an example data flow graph for a neural network model.

Neural networks can be utilized to provide services including image recognition, natural language processing, video processing, or text-based queries, among other examples. A neural network model of a neural network can be represented using a high-level programming language, such as Java, C++, R, Go, Python, or Tensorflow. The neural network model can be processed by a compiler to generate machine level instructions that can be executed by a neural network processor to generate output data based on an input dataset. The input dataset and the output data can be represented using tensors. The input dataset may correspond to an image, a text, an audio, or a video that needs to be operated on. The compiler can process the neural network model over multiple stages that may include generating intermediate representation (IR) instructions based on the neural network model, memory allocation, and optimization for the given hardware architecture before generating the machine level instructions.

In some implementations, a neural network model can be represented using a data flow graph. The data flow graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. Some of the operators in the data flow graph may include data computation operators (e.g., matrix multiplication, activation, pooling, etc.), data shuffle operators (e.g., transpose, split, concatenate, reshape, slice, copy, etc.). The data shuffle operators can be used to perform operations that may involve movement or transformation of data layout of the tensor, which can translate to certain utilization of the hardware resources (e.g., chip area, data path, power consumption) to implement the intended functionality. For large neural network models or datasets, the resource utilization may be higher if a higher number of such data shuffle operations are used. Therefore, it is desirable to reduce data shuffle operations in the neural network models, which can ultimately improve the system performance.

Embodiments can be used to perform graph level optimizations by reducing the number of data shuffle operators in the data flow graph for a neural network model. The optimization algorithm can identify single-entry single-exit (SESE) regions in the data flow graph and select the SESE regions that comprise only the data shuffle operators. The optimization algorithm can go through all the selected SESE regions, one at a time, starting with an innermost region, to generate a corresponding affine map from an input of the region to an output of the region. If the cost of the affine map is lower than the cost of the corresponding region, the region can be replaced with an affine shuffle operator corresponding to the affine map. An inner SESE region can be replaced with an affine shuffle operator prior to generating an affine map for an outer SESE region that includes the inner SESE region. The affine shuffle operator can be implemented as one or more loopnests. For example, an affine shuffle operator implementing a simpler data layout transformation such as a transpose operation may use a single loopnest to change the layout of the data in a tensor array. In another example, for more complex data layout transformations, two loopnests can be used, which may include a first loopnest to transform an input space into a one-dimensional linear space, and a second loopnest to transform the one-dimensional linear space to an output space based on the affine map.

Each affine map can be a mapping between indices of an input tensor to indices of an output tensor. The number of elements in the output tensor can be the same as the input tensor (e.g., transpose), or number of elements in the output tensor can be different than the input tensor (e.g., concatenation) so long as an element of the output tensor can be mapped to an input element of the input tensor. The affine map does not change or manipulate the data values, but can change positions of the data in the tensor array. An affine map for each data shuffle operator in a selected SESE region can be generated, and all these affine maps can be combined progressively to generate a single affine map for the region.

In some embodiments, an affine map for a region can be generated by visiting all the operators in the region in a topological order and building the mapping from the input of the region to the output of the region. Starting with an initial operator of the region, a mapping from an input tensor of the region to an output tensor of each subsequent operator can be generated until a last operator of the region has been selected. The mapping from an input tensor of the region to an output tensor of a subsequent operator can be based on a mapping of the input tensor of the region to an input tensor of the subsequent operator and a mapping of the input tensor of the subsequent operator to the output tensor of the subsequent operator.

In some examples, when the subsequent operator is a result of a split in the data flow graph, a respective mapping for each subsequent operator resulting from the split can be generated to build the affine map. In some examples, when the subsequent operator is a concatenation operator, a union of all the respective mappings of the input tensors to the concatenation operator can be performed for generating the affine map. Thus, by replacing each identified SESE region with a corresponding affine map operator can optimize the neural network model by reducing the total number of data shuffle operators in the data flow graph.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 shows an example data flow graph 100 for a neural network model. The neural network model may correspond to a neural network, which can be used to provide services such as image recognition, natural language processing, video processing, or text-based queries, among others.

The data flow graph 100 may include a plurality of operators to perform operations for data computations, data movement, etc. As an example, the data flow graph 100 may include a computation operator 102, a computation operator 104, a computation operator 106, a computation operator 108, a data shuffle operator 110, a data shuffle operator 112, a data shuffle operator 114, a computation operator 116, a data shuffle operator 118, a data shuffle operator 120, and a data shuffle operator 122. Note that the data flow graph 100 may be part of a bigger data flow graph comprising other or different operators, which are not shown here for the ease of discussion.

In various examples, the data shuffle operators 110-122 can be used to perform data movement or shuffling operations such as split, reshape, concatenate, transpose, among others, and the data computation operators 102-108 can be used to perform computation operations such as matrix multiplication, activation, pooling, normalization, etc., on the tensors of a neural network. A tensor can be a multi-dimensional data structure representing input data, output data, or intermediate data in a neural network. In various examples, a tensor can be a matrix, a vector, a scalar, a 2D array, or a multi-dimensional array. In various embodiments, an optimization algorithm can be employed to optimize the data flow graph 100 by reducing the number of data shuffle operators, as described with reference to FIGS. 2-5.

Figure 2:
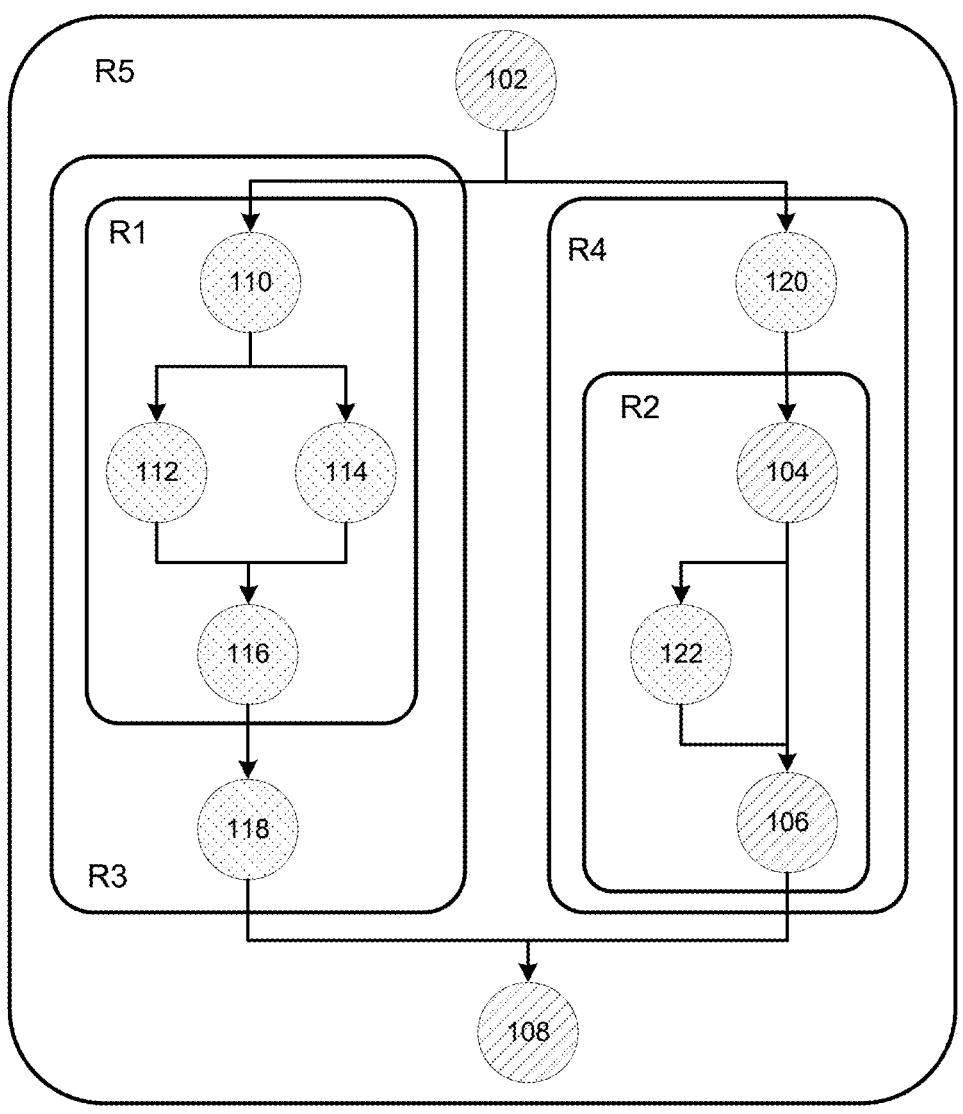
FIG. 2 shows the data flow graph with single-entry single-exit (SESE) regions identified according to some embodiments.

FIG. 2 shows the data flow graph 100 of FIG. 1 with single-entry single-exit (SESE) regions identified according to some embodiments.

The optimization algorithm may first identify all the SESE regions in the data flow graph 100. An SESE region may include a single data shuffle operator node at the entry of the region and a single data shuffle operator node at the exit of the region. As shown in FIG. 2, the optimization algorithm may identify an SESE region R1, an SESE region R2, an SESE region R3, an SESE region R4, and an SESE region R5 in the data flow graph 100. The SESE region R1 may include a single entry to the operator node 110 and a single exit from the operator node 116. Similarly, the SESE region R2 may include a single entry to the operator node 104 and a single exit from the operator node 106. The SESE region R3 may include a single entry to the operator node 110 and a single exit from the operator node 118. The SESE region R4 may include a single entry to the operator node 120 and the single exit from the operator node 106. Finally, the SESE region R5 may include a single entry to the operator node 102 and a single exit from the operator node 108.

The SESE region R1 comprises only the data shuffle operators 110-116. The SESE region R3 comprises only the data shuffle operators 110-118. Whereas the SESE region R2 comprises both the data computation operators 104-106 and the data shuffle operator 122. Similarly, the SESE region R4 comprises both the data computation operators 104-106, and the data shuffle operators 120-122. The SESE region R5 comprises both the data computation operators 102-108 and the data shuffle operators 110-122.

Figure 3:
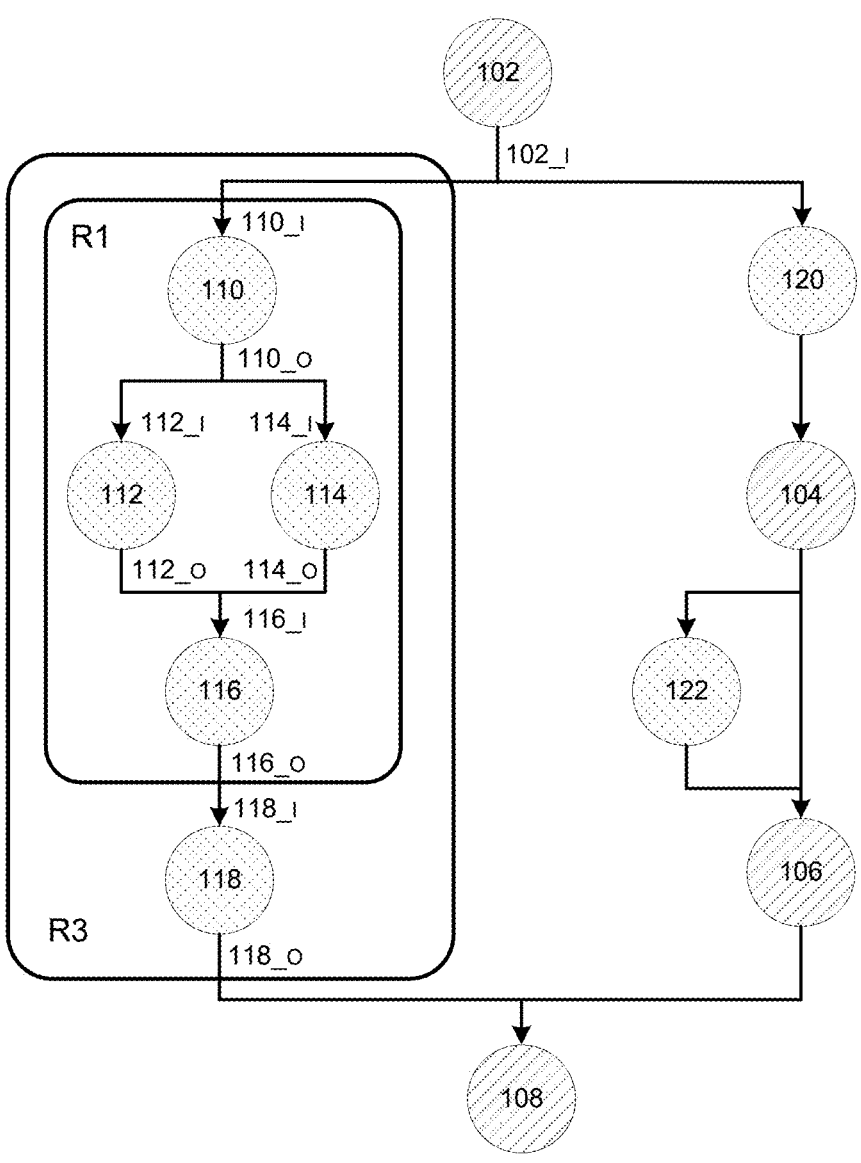
FIG. 3 shows the data flow graph with selected SESE regions comprising only the data shuffle operators, according to some embodiments.

FIG. 3 shows the data flow graph 100 of FIG. 2 with selected SESE regions comprising only the data shuffle operators, according to some embodiments.

In some embodiments, the optimization algorithm may select the SESE regions comprising only the data shuffle operators from all the identified SESE regions for optimization starting with an innermost SESE region. As shown in FIG. 3, only the SESE regions R1 and R3 are selected for optimization from the identified SESE regions R1, R2, R3, R4, and R5. The SESE regions R2, R4, and R5 shown in FIG. 2 include data computations operators and are, therefore, not candidates for optimization.

In some embodiments, the optimization algorithm may optimize each selected SESE region that does not include any data computation operators, starting with an innermost SESE region, by replacing the SESE region with a corresponding affine shuffle operator. The affine shuffle operator for an SESE region may correspond to an affine map that is generated from an input of the SESE region to an output of the SESE region. In some embodiments, a respective affine map for each of the data shuffle operators in the SESE region can be generated, and all these respective affine maps can be combined progressively to generate a single affine map for the SESE region. Combining all the affine maps for each of the single data shuffle operators may depend upon the type of the data shuffle operator.

In some embodiments, generating an affine map from an input of the SESE region to an output of the SESE region may include starting with an initial operator of the SESE region and traversing each subsequent operator in the SESE region in a topological order to generate a mapping from an input tensor of the SESE region to an output tensor of that subsequent operator. Generating the mapping may include determining an intermediate mapping from the input tensor of the SESE region to an input tensor of the subsequent operator, and determining the mapping from the input tensor of the SESE region to the output tensor of the subsequent operator based on the intermediate mapping and a mapping from the input tensor of the subsequent operator to the output tensor of the subsequent operator.

In some examples, when the subsequent operator being selected is a result of a split in the data flow graph, generating the affine map may include generating a respective mapping for each subsequent operator resulting from the split in the data flow graph. When the subsequent operator being selected is a concatenation operator, generating the affine map may include performing a union on respective mappings of input tensors to the concatenation operator. In some embodiments, the existing software libraries can be used during compilation for some of the operators based on the type of the operator.

As an example, in FIG. 3, an input 110_$i$, an input 112_$i$, an input 114_$i$, an input 116_$i$, and an input 118_$i$ may represent an input tensor in an input address space of the data shuffle operators 110, 112, 114, 116, and 118, respectively. Additionally, an output 110_$o$, an output 112_$o$, an output 114_$o$, an output 116_$o$, and an output 118_$o$ may represent an output tensor in an output address space of the data shuffle operators 110, 112, 114, 116, and 118, respectively. Furthermore, the input 110_$i$ may also represent the input tensor of the SESE region R1 and the output 116_$o$ may also represent the output tensor of the SESE region R1. Additionally, the input 110_$i$ may also represent the input tensor of the SESE region R3 and the output 118_$o$ may also represent the output tensor of the SESE region R3.

For example, a first affine map from the input 110_$i$ of the SESE region R1 to the output 116_$o$ of the SESE region R1 can be generated based on a mapping from the input 110_$i$ of the SESE region R1 to the corresponding output tensor of each of the subsequent data shuffle operators 110, 112, 114, and 116. In some embodiments, the data shuffle operator 110, being the entry to the SESE region R1, can be selected as an initial operator for traversing through the SESE region R1. In some examples, the data shuffle operator 110 can be a split operator, and the subsequent data shuffle operators 112 and 114 can be reshape operators. In such cases, a respective mapping from the input 110_$i$ of the data shuffle operator 110 to the output 112_$o$ of the subsequent data shuffle operator 112 and from the input 110_$i$ of the data shuffle operator 110 to the output 114_$o$ of the subsequent data shuffle operator 114 can be generated.

In some embodiments, a first mapping from the input 110_$i$ to the output 112_$o$ of the subsequent data shuffle operator 112 can be generated based on an intermediate mapping from the input 110_$i$ of the data shuffle operator 110 to the input 112_$i$ of the data shuffle operator 112, and the mapping from the input 112_$i$ of the data shuffle operator 112 to the output 112_$i$ of the data shuffle operator 112. Similarly, a second mapping from the input 110_$i$ to the output 114_$o$ of the subsequent data shuffle operator 114 can be generated based on an intermediate mapping from the input 110_$i$ of the data shuffle operator 110 to the input 114_$i$ of the data shuffle operator 114, and the mapping from the input 114_$i$ of the data shuffle operator 114 to the output 114_$i$ of the data shuffle operator 114.

As shown in FIG. 3, the data shuffle operator 116 can be a concatenation operator with the input 112_$o$ and the input 114_$o$. In some embodiments, the data shuffle operator 116 can perform a union of the first mapping and the second mapping to map the input 110_$i$ to the input 116_$i$ of the subsequent data shuffle operator 116. Thus, the first affine map for the SESE region R1 can be generated based on the union operation of the first mapping and the second mapping, and the mapping of the input 116_$i$ to the output 116_$o$. The first affine map can be a mathematical function that maps an input address space of the region R1 to an output address space of the region R1.

Some embodiments may compare the implementation cost of each affine map with the implementation cost of the corresponding SESE region to determine whether the SESE region can be replaced with the affine map. If the implementation cost of the affine map is smaller than the implementation cost of the SESE region, the affine map can replace that SESE region in the data flow graph. For example, an implementation cost of the first affine map for the SESE region R1 can be calculated based on the hardware resources required to implement the first affine map based on the specification and architecture of the neural network processor. For example, implementing an affine map may involve data transfers between various components, direct memory access (DMA) transfers, or memory accesses. In some cases, large or frequent data transfers can increase the hardware resource usage. If the implementation cost of the first affine map is smaller than the cost of the SESE region R1, a first affine shuffle operator corresponding to the first affine map can be used to replace the SESE region R1, as described with reference to FIG. 4. The affine shuffle operator can be implemented as one or more loopnests. In some examples, two loopnests can be used to implement the affine shuffle operator including a first loopnest to transform the input space into a one-dimensional linear space, and a second loopnest to transform the one-dimensional linear space to the output space based on the affine map. For example, the affine shuffle operator being implemented to replace the SESE region R1 may include a first loopnest that transforms the tensor input 110_$i$ into a 1-D linear set of elements, and a second loopnest that transforms the 1-D linear set of elements to the tensor output 116_$o$.

Figure 4:
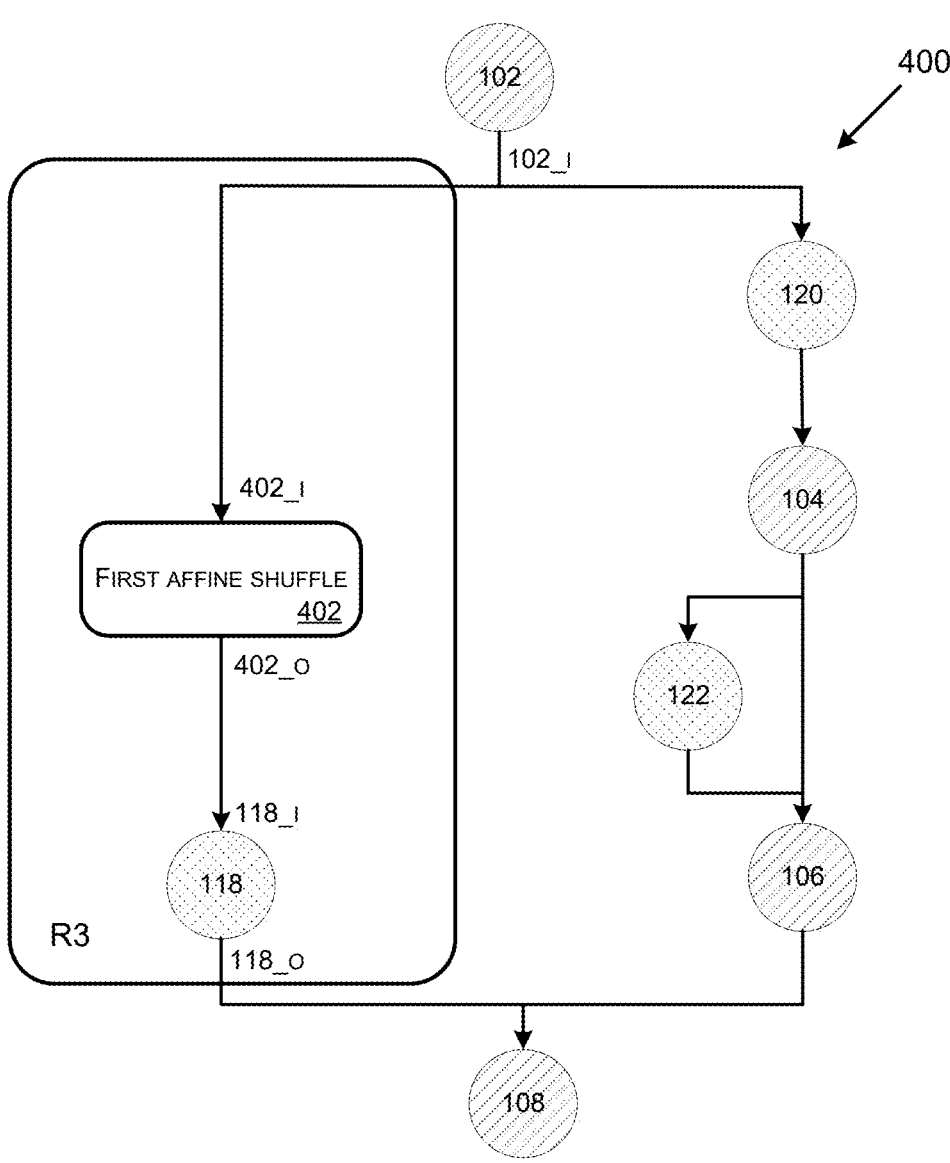
FIG. 4 shows an example data flow graph with the inner SESE region of the data flow graph replaced with a first affine shuffle operator, according to some embodiments.

FIG. 4 shows an example data flow graph 400 with the inner SESE region R1 of the data flow graph 100 replaced with a first affine shuffle operator, according to some embodiments.

As shown in FIG. 4, a first affine shuffle operator 402 can replace the SESE region R1 as described with reference to FIG. 3. Once the inner SESE region R1 has been replaced, the outer SESE region R3 can be replaced. For example, a second affine map from an input 402_$i$ of the SESE region R3 to an output 118_$o$ of the SESE region R3 can be generated. The second affine map can be a mathematical function that maps an input address space of the region R3 to an output address space of the region R3. The second affine map can be generated based on a mapping of the input 402_$i$ of the first affine shuffle operator 402 to an input 118_$i$ of the data shuffle operator 118, and a mapping of the input 118_$i$ to the output 118_$o$ of the data shuffle operator 118. If an implementation cost of the second affine map is smaller than the cost of the SESE region R3, a second affine shuffle operator corresponding to the second affine map can be used to replace the SESE region R3, as described with reference to FIG. 5.

Figure 5:
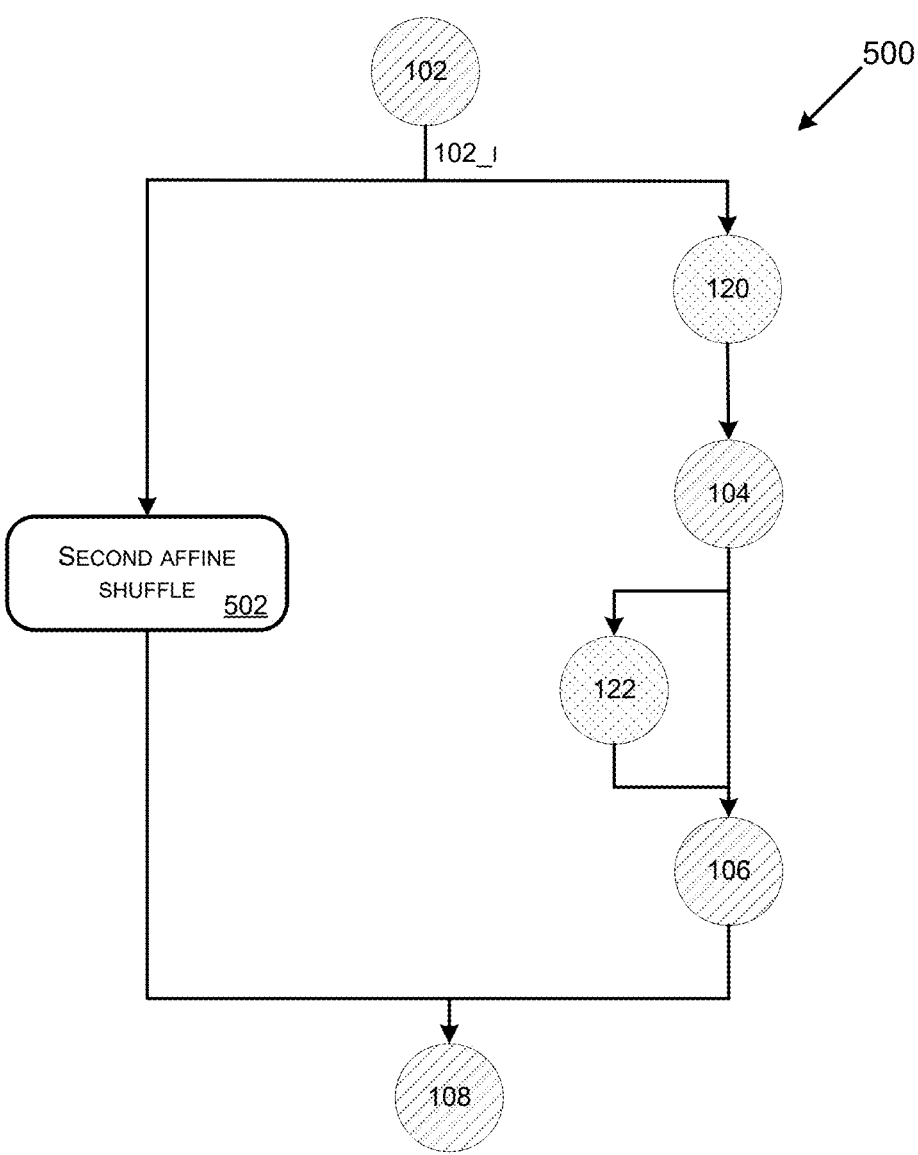
FIG. 5 shows a reduced data flow graph with the outer SESE region of the data flow graph replaced with a second affine shuffle operator, according to some embodiments.

FIG. 5 shows a reduced data flow graph 500 with the outer SESE region R3 of the data flow graph 400 replaced with a second affine shuffle operator, according to some embodiments.

As discussed with reference to FIG. 4, a second affine shuffle operator 502 corresponding to the second affine map can replace the SESE region R3. Thus, as shown in FIG. 5, the reduced data flow graph 500 may include fewer operators as compared to the original data flow graph 100 in FIG. 3. In certain embodiments, the reduced flow graph 500 can be used by a compiler to generate machine code for the neural network model instead of the data flow graph 100, which can include fewer data movement operations and optimize the neural network model. This is further explained with reference to FIG. 6.

Figure 6:
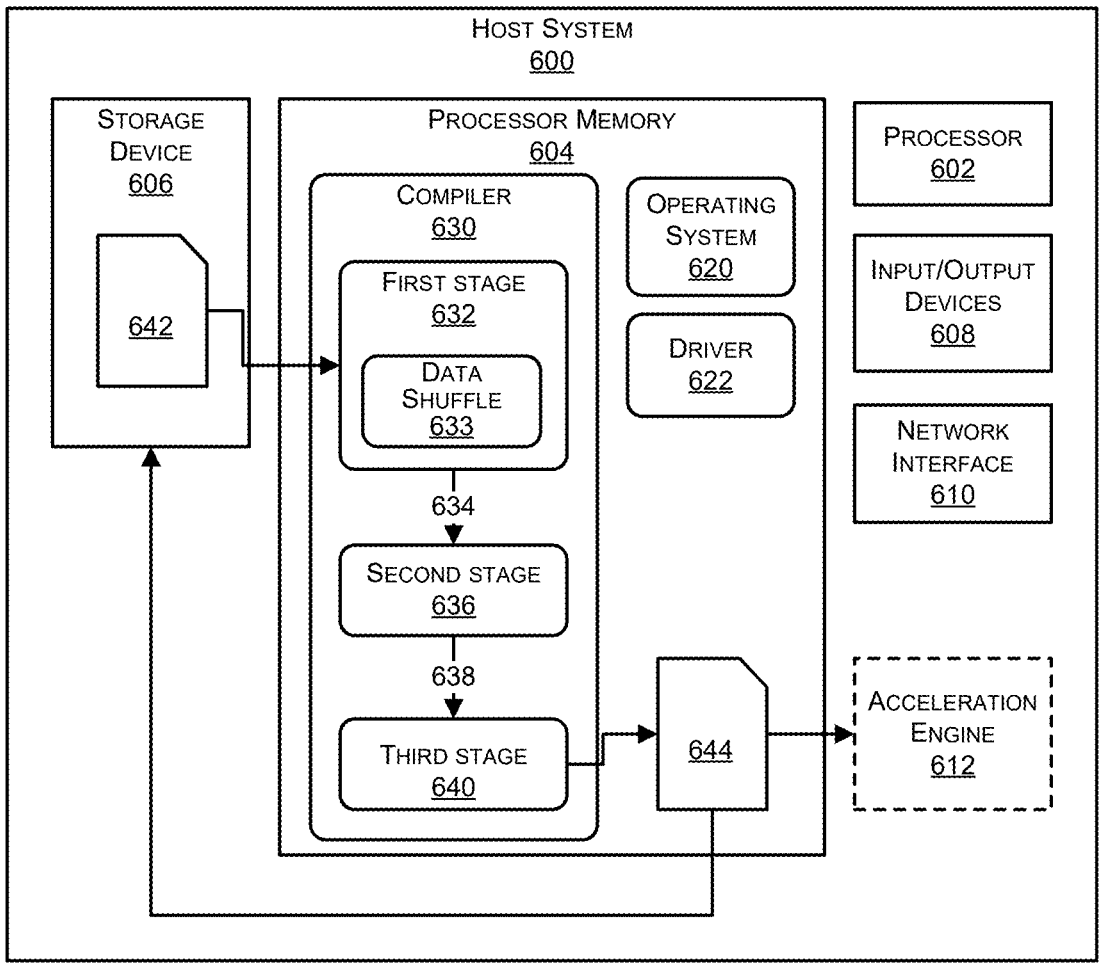
FIG. 6 illustrates a block diagram of an example of a compiler in a host system.

FIG. 6 illustrates a block diagram of an example of a host system 600 on which a compiler 630 can run. The illustrated host system 600 is an example of a computing device, and includes a processor 602, a processor memory 604, at least one storage device 606, various Input/Output (I/O) devices 608, and at least one network interface 610. In the example of FIG. 6, the host system 600 also includes an acceleration engine 612, which is an integrated circuit device that can accelerate certain operations or computations performed by the host system 600. In various examples, the host system 600 can be implemented as a server in a data center, a desktop computer, a laptop computer, a tablet computer, or a smartphone, among other examples. In some examples, operations or components discussed below as being performed or included in the host system 600 can be performed or included in other computer devices. For example, the compiler 630 can execute on the host system 600 while the acceleration engine 612 is located in a different host system or different computing device.

The processor 602 is an integrated circuit device that can execute program code, in the form of instructions. The program code can be for various software applications or tools, such as an operating system 620 or the illustrated compiler 630. While the processor 602 is executing a program, the instructions for the program can be stored in the processor memory 604. The instructions can also be stored elsewhere, such as on the storage device 606, and can be loaded into the processor memory 604 when needed by the processor 602. The processor 602 can also use the processor memory 604 for temporary storage of other data that the processor 602 is operating on. In various examples, the processor memory 604 is a volatile memory type, such as a type of random access memory, though non-volatile memory types can, alternatively or additionally, be used for the processor memory 604.

The storage device 606 is an example of a device that can include non-volatile memory. For example, the storage device 606 can be a magnetic disk drive, a solid-state drive, or an optical drive, among other examples. Program code and other data stored on the storage device 606 can remain present when the storage device 606 is not powered on. Storage device 606 can be uses as a type of non-transitory storage medium, or may include a reader that can access non-transitory storage medium.

The storage device 606 is one example of a peripheral device. A peripheral device is a component that can be coupled to the host system 600 to add functionality to the host system 600. Other examples of peripheral devices include Input/Output devices 608 and network interface 610. The Input/Output devices 608 can include user input and/or output devices, such as keyboard, mouse, pointer, touchpad, touchscreen, microphone, display screen, speaker, printer, and scanner, among other examples. Network interface 610, which can be implemented using a network interface card, can provide access to one or more networks. Network interface 610 can include, for example, a physical port for connecting a network cable and/or one or more antennas and/or radios for wireless communication such as Wi-Fi, cellular, and/or other over-the-air networks. Network interface 610 can also be described as an I/O device.

The acceleration engine 612 is also another type of peripheral device or I/O device. The acceleration engine 612 is a device that is purpose-built to perform certain operations that can be performed by the processor 602, but can be performed faster by the acceleration engine 612. For example, the acceleration engine 612 can be a neural network accelerator that is capable of performing large scale, parallel computations of a neural network more efficiently than when the computations are performed by the processor 602. As another example, the acceleration engine 612 can be a graphics processing unit (GPU), and may be optimized to perform the computations needed for graphics rendering. Other examples of devices that can be implemented by the acceleration engine 612 include cryptographic accelerators, compression and decompression accelerators, 3-D accelerators, regular expression accelerators, security accelerators, and others.

In various examples, the acceleration engine 612 can execute program code to perform certain operations. For example, when the acceleration engine 612 is a neural network accelerator, the acceleration engine 612 can be programmed to execute a particular neural network model, such as one that performs image recognition or one that performs machine translation. As a further example, to support the execution of a neural network model, the acceleration engine 612 can be programed to perform operations such as copying data for the neural network between processor memory 604 and the acceleration engine 612 (e.g., copying input data for the neural network from processor memory 604 into the acceleration engine 612, copying results from the acceleration engine 612 into the processor memory 604, etc.).

To generate program code for the acceleration engine 612, the host system 600 can execute the compiler 630. Compilers, in general, are software programs that translate program code written in a human-readable language into a format (e.g., machine instructions) that can be read and processed by an integrated circuit device. In the example of FIG. 6, the acceleration engine 612 can be a neural network accelerator, and the compiler 630 can be a compiler for compiling a neural network description into instructions to be executed by the acceleration engine 612. When the acceleration engine 612 implements a different type of accelerator, a different compiler can be used.

The compiler 630 can be activated, for example, when the operating system 620 receives keyboard, mouse, touch-screen, voice command, or other inputs from the Input/Output devices 608. The inputs can further include parameters for the compiler 630, such as input code 642 to compile and configuration options for the compilation process. Once the compiler 630 is activated, the processor 602 can load the instructions for the compiler 630 into the processor memory 604, and execute the compiler from the processor memory 604. In some implementations, compiler 630 may identifying steps to be performed by the processor 602, rather than by the acceleration engine 612. For example, the processor 602, through the execution of a driver 622, may need to perform steps such as configuring Direct Memory Access (DMA) descriptors for moving data into or out of the acceleration engine 612, among other examples.

In the example of FIG. 6, the compiler 630 includes a first stage 632, a second stage 636, and a third stage 640, which each perform different operations to produce compiled code 644. In other examples, the compiler 630 can combine the operations of the first stage 632, second stage 636, and/or third stage 640 into fewer stages, or can divide the operations of one or more of the stages into multiple stages. In some implementations, compiler 630 can also be modified such that certain operation(s) from one stage can be executed in a different stage.

The first stage 632 (may also be referred to as the front stage) can receive and process input code 642. The input code 642 can describe a program in a high-level programming language, such as Python, Java, C++, among other examples, and may utilize software libraries tailored for neural networks such as TensorFlow, PyTorch, etc. The input code 642 can be a description of a neural network model that describe, for example, steps to perform image recognition, speech recognition, machine translation, or other operations. The input code 642 can be obtained from the storage device 606. Alternatively, though not illustrated, the input code 642 can be located in the processor memory 604, or can be obtained from a network location using the network interface 610.

Processing of the input code 642 can include parsing the input code 642, performing syntax and semantic analysis on the input code 642 to identify operators (e.g., operations such as computations, data shuffle, memory accesses, and/or other functions, etc.) described in the input code 642, and sorting the operators described in the input code 642. For example, the operators described in the input code 642 can be sorted into layers, where the outputs of one layer provide the inputs to a next layer. The output of the first stage 632 can be an intermediate representation (IR) 634 of the input code 642. In some implementations, the IR 634 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. Data rearrangement operations can also be termed as data shuffle or data movement operations. The compute graph can be organized, for example, in the layers, nodes, and connections between nodes of a neural network model. The first stage 632 may also include data shuffle replacement logic 633 that replaces groups of data shuffle operators with affine shuffle operators in the data flow graph using the techniques disclosed herein to reduce the data flow graph for subsequent operations. In some implementations, the data shuffle replacement logic 633 can alternatively be implemented at the beginning of the second stage 636.

The second stage 636 (may also be referred to as the middle-end stage) can perform intermediate processing on the IR 634 output from the first stage 632. The intermediate processing may include performing various optimizations on the IR 634. The optimizations may include target independent optimizations that are hardware agnostic, and/or target specific optimizations that are tailored for the hardware architecture executing the program of input code 642. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 612) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 612 to perform at the same time. The acceleration engine 612 may, for example, have a limited amount of local storage space for the data needed for a computation, or the computations may be more than the acceleration engine 612 can perform at one time. In such scenario, the operators of the layer or node can be broken down into smaller operations, which can fit into the acceleration engine's local memory and/or can fit into the computing capacity of the acceleration engine 612. The output of the second stage 636 can be an optimized IR 638 such as code representing an optimized compute graph.

The third stage 640 (may also be referred to as the back-end stage) can operate on the output 638 of the second stage 636, and perform various steps before producing the instructions (e.g., machine code) that are to be executed by the acceleration engine 612. These steps can include instruction and data scheduling, register allocation, and/or code generation. Instruction and data scheduling determines the order in which instructions are executed and data are processed by the acceleration engine 612, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 612, and includes mapping operations into hardware instructions according to the architecture of the acceleration engine 612. The output of the third stage 640 is compiled code 644, which may include machine instructions in binary format. In some examples, the compiled code 644 can be stored in the processor memory 604.

Alternatively, or additionally, the compiled code 644 can be copied to the storage device 606 or to a network location. As noted above, the acceleration engine 612 may be located at a different host system, in which case the compiled code 644 can be sent over the network interface 610 to the other host system.

In the example of FIG. 6, the host system 600 can be executing a driver 622, which can also be referred to as a device driver or runtime driver, that manages the acceleration engine 612. The driver 622 can provide an interface between applications executing on the host system 600 (or on another host system) and the acceleration engine 612. For example, the driver 622 can provide an Application Program Interface (API) that defines functions for feeding input data to the acceleration engine 612 and defining the operation to perform on the input data. In this and other examples, the driver 622 can configure the acceleration engine 612 to perform the operation. For example, the driver 622 can identify a neural network model that the acceleration engine 612 is to execute, as well as the location in the processor memory 604 or on the storage device 606 where the compiled code 644 for the neural network model is located. The driver 622 can further load into the acceleration engine 612 or cause the acceleration engine 612 to load the compiled code 644, can load or cause the acceleration engine 612 to load the input data on which the neural network model is to operate, and/or can cause the acceleration engine 612 to being executing on the input data. Once the acceleration engine 612 has finished, the acceleration engine 612 can notify the driver 622, and the driver 622 can deliver a result back to the application that requested the result.

FIG. 7 shows an example flow chart 700 for a method to optimize a neural network model, according to some embodiments. The method can be executed by a compiler for a neural network, such as the compiler 630 described with reference to FIG. 6. Although certain aspects of the flow chart 700 will be described using the data flow graph of FIGS. 1-5, it should be understood that the steps of the flow chat 700 can be applied to data flow graphs with other arrangements and combinations of operators.

In step 702, the method includes identifying SESE regions in a data flow graph for a neural network model. For example, the compiler 630 may receive a description of the neural network model in the first stage 632 as the input code 642. The compiler 630 may generate an intermediate representation (IR) of the neural network model representing a data flow graph. For example, the output of the first stage 632 can be the IR 634 representing the data flow graph 100 of FIG. 1. The IR 634 can be optimized in the second stage 636 using the optimization algorithm described with reference to FIGS. 1-5. The data flow graph 100 may comprise the data computation operators 102-108, and the data shuffle operators 110-122. As discussed with reference to FIG. 2, the optimization algorithm can be used to identify the SESE regions R1, R2, R3, R4, and R5 in the data flow graph 100.

In step 704, the method includes selecting one or more regions from the identified SESE regions that do not include data computation operators. As discussed with reference to FIGS. 2 and 3, the optimization algorithm may traverse through all the identified SESE regions R1, R2, R3, R4, and R5 to select only the SESE regions R1 and R3 that do not include any data computation operators. For example, the region R1 is an inner SESE region and the region R3 is an outer SESE region that comprise the SESE region R1.

In step 706, the method includes generating an affine map from an input of a selected region to an output of the selected region. As an example, a first affine map for the innermost SESE region R1 can be generated first from the input 110_i of the SESE region R1 to the output 116_o of the SESE region R1, as discussed with reference to FIG. 3. Generation of the first affine map is described in detail with reference to FIG. 8.

In step 708, the method includes generating an affine shuffle operator based on the affine map. As discussed with reference to FIG. 3, a first affine shuffle operator can be generated based on the first affine map corresponding to the region R1.

In step 710, the method includes replacing the region with the affine shuffle operator. For example, the SESE region R1 can be replaced with the first affine shuffle operator 402 as described with reference to FIG. 4. In some embodiments, the SESE region R1 can only be replaced with the first affine shuffle operator 402 if the implementation cost of the first affine shuffle operator 402 is less than the implementation cost of the SESE region R1.

In step 712, the method includes determining whether all the selected SESE regions have been processed. Since only the SESE region R1 has been processed so far from the selected SESE regions R1 and R3, the SESE region R3 can be processed next. For example, a second affine map for the SESE region R3 can be generated in the step 708, and the SESE region R3 can be replaced with the second affine shuffle operator 502 in the step 710. In some embodiments, the SESE region R3 can only be replaced with the second affine shuffle operator 502 if the implementation cost of the second affine shuffle operator 502 is less than the implementation cost of the SESE region R3.

In step 714, the method includes providing an output representation of the reduced data flow graph. Once all the selected SESE regions (e.g., R1 and R3) have been processed, the reduced data flow graph 500 may include fewer operators as compared to the original data flow graph 100.

For example, the output representation of the reduced data flow graph 500 may correspond to the optimized IR 638, which can be used to generate the machine code for the optimized neural network model in the third stage 640.

Figure 8:
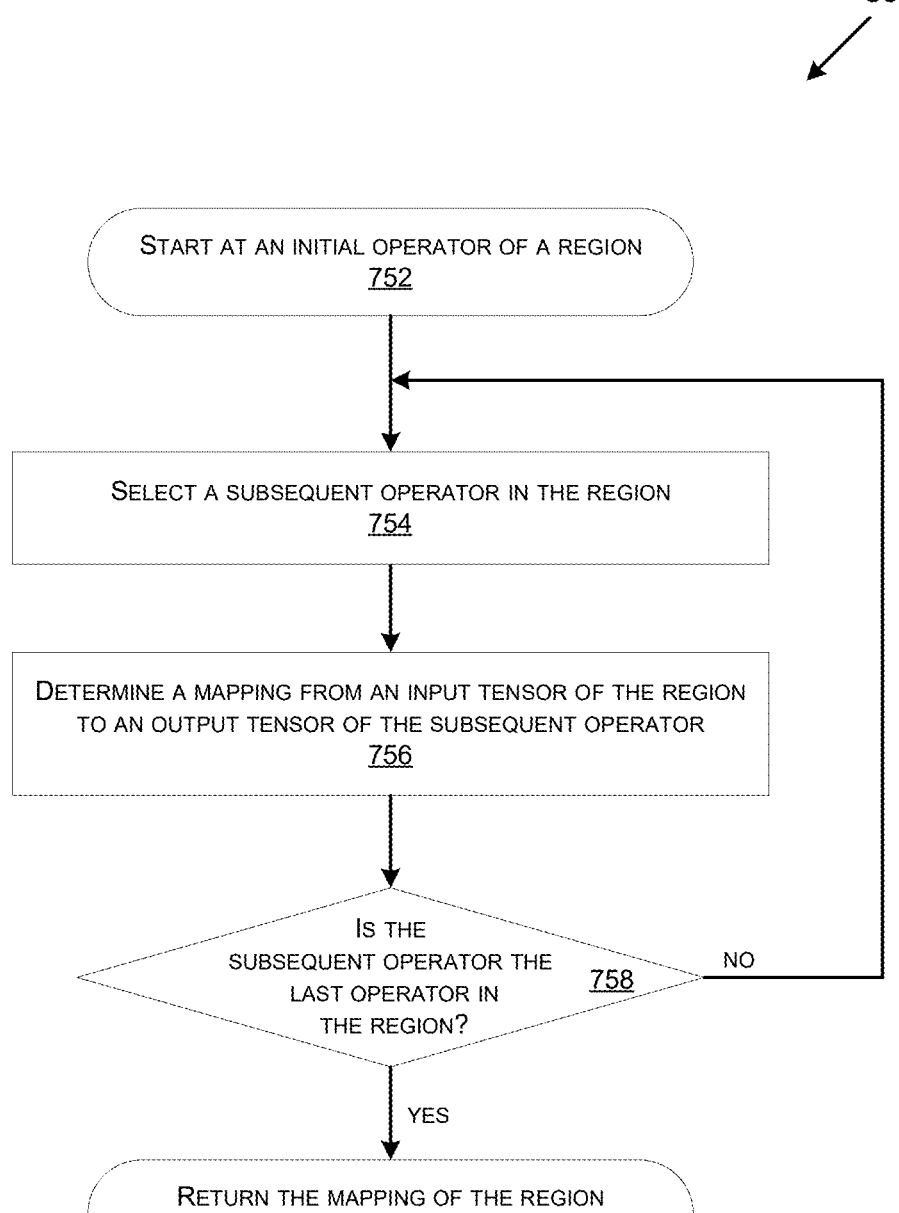
FIG. 8 shows an example flow chart for a method to generate an affine map from an input of an SESE region to an output of the SESE region, according to some embodiments.

FIG. 8 shows an example flow chart 800 for a method to generate an affine map from an input of an SESE region to an output of the SESE region, according to some embodiments. In some examples, the method to generate the affine map can be executed in the step 706 described with reference to FIG. 7. For example, the method can be executed to generate the first affine map corresponding to the SESE region R1, and the second affine map corresponding to the SESE region R3. Although certain aspects of the flow chart 800 will be described using the data flow graph of FIGS. 1-5, it should be understood that the steps of the flow chart 800 can be applied to data flow graphs with other arrangements and combinations of operators.

In step 752, the method includes starting at an initial operator of a region. For example, generating the first affine map for the SESE region R1 may include starting at the initial operator 110 as shown in FIG. 3.

In step 754, the method includes selecting a subsequent operator in the region. As described with reference to FIG. 3, the subsequent operator 112 can be selected.

In step 756, the method includes determining a mapping from an input tensor of the region to an output tensor of the subsequent operator. In some examples, when the subsequent operator being selected is a result of a split in the data flow graph, generating the affine map can include generating a respective mapping for each subsequent operator resulting from the split in the data flow graph. Since the data shuffle operator 110 is performing a split operation, a first mapping from the input tensor of the region R1 to the output tensor of the operator 112 and a second mapping from the input tensor of the region R1 to the output tensor of the operator 114 can be determined. In some examples, the first mapping can be determined based on an intermediate mapping from the input 110_i to the input 112_i, and the mapping from the input 112_i to the output 112_o. Similarly, the second mapping can be determined based on an intermediate mapping from the input 110_i to the input 114_i, and the mapping from the input 114_i to the output 114_o.

In step 758, the method includes determining whether the subsequent operator is the last operator in the region. Since the subsequent operator 114 is not the last operator in the region R1, another subsequent operator 116 is selected in the step 754. Next, a mapping for the input 110_i to the output 116_o can be determined in the step 756. Since the subsequent operator 116 is a concatenation operator, generating the first affine map may include performing a union on the first mapping and the second mapping to determine the intermediate mapping of the input 110_i to the input 116_i. The first affine map for the region R1 can be determined based on the intermediate mapping resulting from the union and the mapping of the input 116_i to the output 116_o.

In step 760, the method includes returning the mapping of the region. The first affine map for the region R1 can be returned to the step 706 in FIG. 7, which can be used to generate the first affine shuffle operator 402 as described previously. Similarly, the flow chart 800 can be used to generate the second affine map for the region R3, and returned to the step 706.

Figure 9:
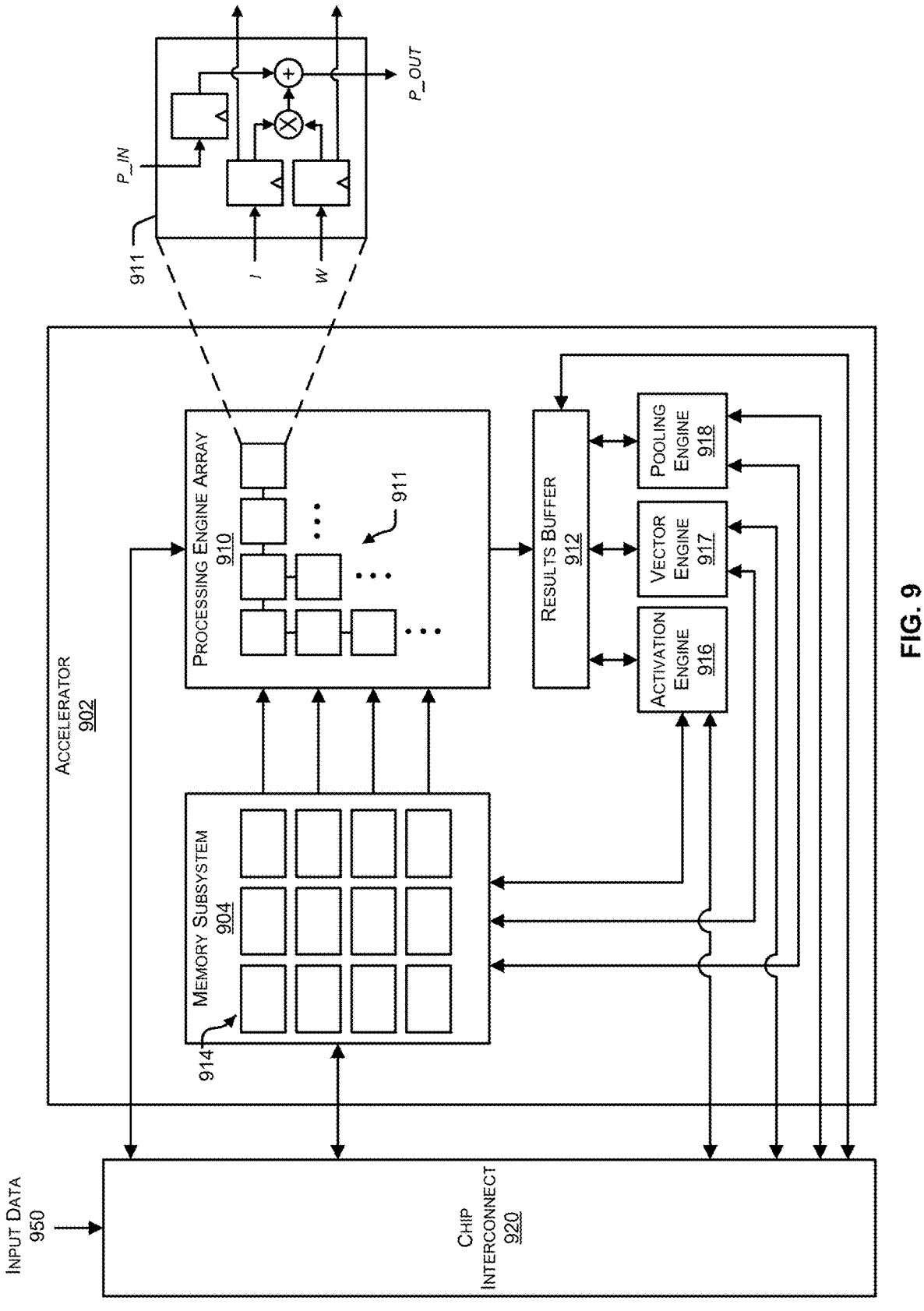
FIG. 9 illustrates a block diagram of an example of an integrated circuit device.

FIG. 9 is a block diagram illustrating an example of an integrated circuit device that can execute the compiled executable code generated from a compiler. The example of FIG. 9 illustrates an accelerator 902. In various examples, the accelerator 902, for a set of input data (e.g., input data 950), can execute computations using a processing engine array 910, an activation engine 916, a vector engine 917, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started. In various implementations, the memory subsystem 904 can be configured to simultaneously service multiple clients, including the processing engine array 910, the activation engine 916, the vector engine 917, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916, the vector engine 917, and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 128 rows, or some other number of columns and/or rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p in, provided either from another processing engine 911 or from a previous round of computation by the processing engine array 910. When starting a computation for a new set of input data, the top row of the processing engine array 910 can receive a fixed value for p in, such as zero. As illustrated by this example, i and w are multiplied together and the result is summed with p in to produce a new partial sum, p out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

In some implementations, the accelerator 902 can further include a vector engine 917. Vector engine 917 is a compute engine that can perform computations and manipulations on values stored in memory subsystem 904 and/or results buffer 912 such as values representing matrices of input values, weight values, intermediate results, etc. Vector engine 917 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 917 can operate in parallel and/or simultaneously. In some examples, the vector engine 917 can be bypassed or be omitted.

Herein, the activation engine 916, the vector engine 917, and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916, the vector engine 917, and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
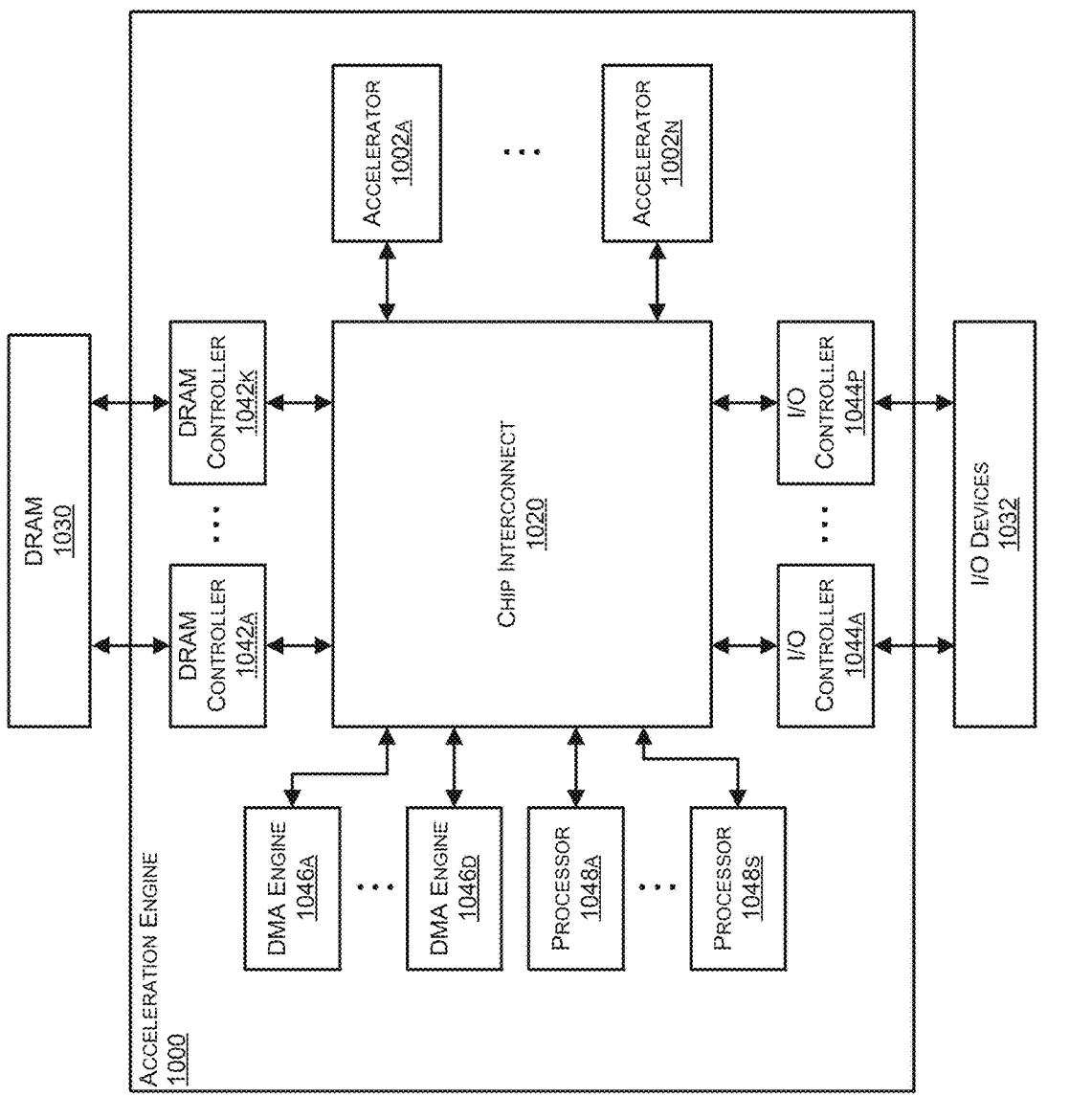
FIG. 10 illustrates a block diagram of an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 9.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general-purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the is a graphics accelerator) or can be different (e.g., the accelerators 1002a-1002n include a graphics accelerator, a floating point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
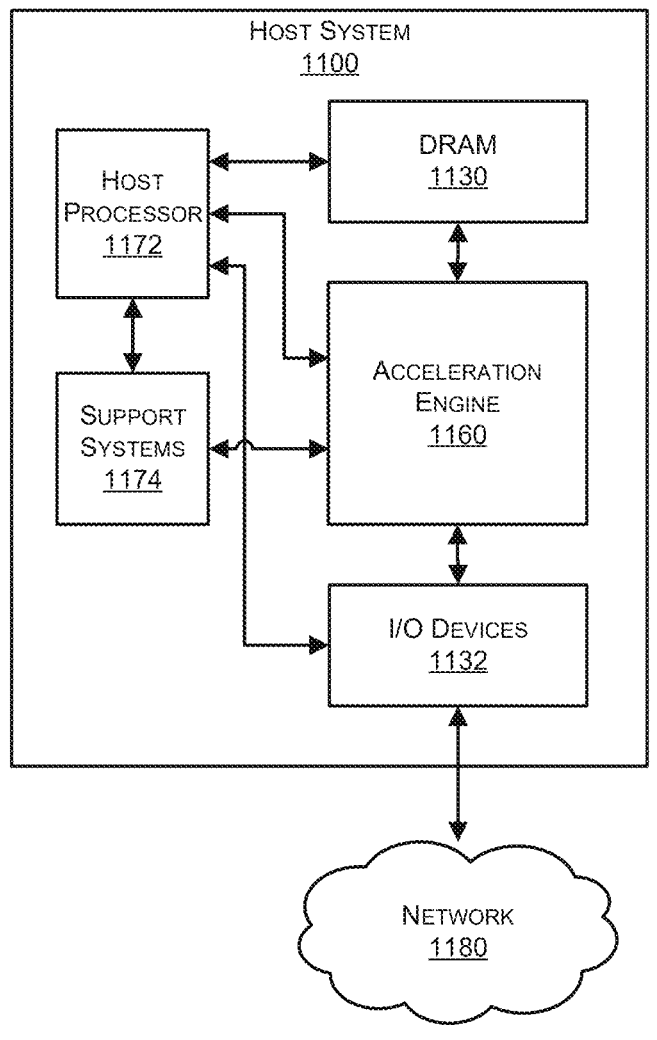
FIG. 11 illustrates a block diagram of an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general-purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method performed by a compiler to optimize a neural network model, comprising:
   receiving a description of the neural network model;
   generating an intermediate representation of the neural network model representing a data flow graph, the data flow graph comprising a plurality of operators;
   identifying single-entry single-exit (SESE) regions in the data flow graph;
   selecting one or more SESE regions in the identified SESE regions that do not include data computation operators;
   for each region in the selected SESE regions, starting with an innermost region:
      generating an affine map from an input of the region to an output of the region;

determining whether an implementation cost of the affine map is lower than an implementation cost of the region;

upon determining that the implementation cost of the affine map is lower than the implementation cost of the region, generating an affine shuffle operator that rearranges data elements at the input of the region into the output of the region based on the affine map; and replacing the region with the affine shuffle operator to reduce the data flow graph; and generating machine code that includes the affine shuffle operator instead of the replaced region for the neural network model from the reduced data flow graph.

2. The computer-implemented method of claim 1, wherein generating an affine map from the input of the region to the output of the region includes:

performing, for each operator in the selected SESE region, starting with an initial operator and until a last operator of the region is selected, operations including:

selecting a subsequent operator in the selected SESE region based on a topological order;

generating a mapping from an input tensor of the region to an output tensor of the subsequent operator based on:

a mapping of the input tensor of the region to an input tensor of the subsequent operator; and a mapping of the input tensor of the subsequent operator to the output tensor of the subsequent operator; and providing a mapping of the input tensor of the region to the output tensor of the last operator as the affine map.

3. The computer-implemented method of claim 2, wherein when the subsequent operator being selected is a result of a split in the data flow graph, generating the affine map includes generating a respective mapping for each subsequent operator resulting from the split in the data flow graph.

4. The computer-implemented method of claim 2, wherein when the subsequent operator being selected is a concatenation operator, generating the affine map includes performing a union on respective mappings of input tensors to the concatenation operator.

5. A computer-implemented method, comprising:

identifying single-entry single-exit (SESE) regions in a data flow graph for a neural network model, the data flow graph comprising a plurality of operators;

for each identified SESE region that does not include data computation operators:

generating an affine map from an input of the identified SESE region to an output of the identified SESE region;

generating an affine shuffle operator that rearranges data elements at the input of the identified SESE region into the output of the identified SESE region based on the affine map; and replacing the identified SESE region with the affine shuffle operator to reduce the data flow graph; and generating machine code that includes the affine shuffle operator instead of the replaced region for the neural network model from the reduced data flow graph.

6. The computer-implemented method of claim 5, wherein the affine shuffle operator is generated for each identified SESE region starting with an innermost identified SESE region that does not include the data computation operators.

7. The computer-implemented method of claim 5, wherein an inner SESE region is replaced with an affine shuffle operator prior to generating an affine map for an outer SESE region that includes the inner SESE region.

8. The computer-implemented method of claim 5, wherein generating an affine map from an input of an identified SESE region to an output of the identified SESE region includes:

for each operator in the identified SESE region, starting with an initial operator:

selecting a subsequent operator in the identified SESE region; and generating a mapping from an input tensor of the identified SESE region to an output tensor of the subsequent operator.

9. The computer-implemented method of claim 8, wherein the subsequent operator is selected based on a topological order.

10. The computer-implemented method of claim 8, wherein generating the mapping from the input tensor of the identified SESE region to the output tensor of the subsequent operator being selected includes:

determining an intermediate mapping from the input tensor of the identified SESE region to an input tensor of the subsequent operator; and determining the mapping from the input tensor of the identified SESE region to the output tensor of the subsequent operator based on the intermediate mapping and a mapping from the input tensor of the subsequent operator to the output tensor of the subsequent operator.

11. The computer-implemented method of claim 8, wherein when the subsequent operator being selected is a result of a split in the data flow graph, generating the affine map includes generating a respective mapping for each subsequent operator resulting from the split in the data flow graph.

12. The computer-implemented method of claim 8, wherein when the subsequent operator being selected is a concatenation operator, generating the affine map includes performing a union on respective mappings of input tensors to the concatenation operator.

13. The computer-implemented method of claim 5, wherein an identified SESE region is replaced with an affine shuffle operator based on an implementation cost of a corresponding affine map being lower than an implementation cost of the identified SESE region.

14. The computer-implemented method of claim 5, wherein operators in the identified SESE region include a split operator, a reshape operator, a concatenation operator, or a transpose operator.

15. The computer-implemented method of claim 5, wherein the data flow graph corresponds to an intermediate representation of the neural network model.

16. A non-transitory computer readable medium having stored therein instructions that, when executed by one or more processors, cause the one or more processors to execute a compiler, the compiler performing operations including:

identifying single-entry single-exit (SESE) regions in a data flow graph for a neural network model, the data flow graph comprising a plurality of operators;

for each identified SESE region that does not include data computation operators:

generating an affine map from an input of the identified SESE region to an output of the identified SESE region;

generating an affine shuffle operator that rearranges data elements at the input of the identified SESE region into the output of the identified SESE region based on the affine map; and replacing the identified SESE region with the affine shuffle operator to reduce the data flow graph; and generating machine code that includes the affine shuffle operator instead of the replaced SESE region for the neural network model based on the reduced data flow graph.

17. The non-transitory computer readable medium of claim 16, wherein generating an affine map from an input of an identified SESE region to an output of the identified SESE region includes:

for each operator in the identified SESE region, starting with an initial operator:

selecting a subsequent operator in the identified SESE region; and generating a mapping from an input tensor of the identified SESE region to an output tensor of the subsequent operator.

18. The non-transitory computer readable medium of claim 17, wherein generating the mapping from the input tensor of the identified SESE region to the output tensor of the subsequent operator being selected includes:

determining an intermediate mapping from the input tensor of the identified SESE region to an input tensor of the subsequent operator; and determining the mapping from the input tensor of the identified SESE region to the output tensor of the subsequent operator based on the intermediate mapping and a mapping from the input tensor of the subsequent operator to the output tensor of the subsequent operator.

19. The non-transitory computer readable medium of claim 16, wherein operators in the identified SESE region include a split operator, a reshape operator, a concatenation operator, or a transpose operator.

20. The non-transitory computer readable medium of claim 16, wherein the machine code is executed by a neural network processor.

\* \* \* \* \*